(12) United States Patent
Kudinov

(10) Patent No.: US 11,182,227 B2
(45) Date of Patent: Nov. 23, 2021

(54) CALL PROCESS FOR GRAPH DATA OPERATIONS

(71) Applicants: Atlassian Pty Ltd, Sydney (AU); Atlassian, Inc., San Francisco, CA (US)

(72) Inventor: Alexander Kudinov, San Mateo, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 32 days.

(21) Appl. No.: 16/262,822

(22) Filed: Jan. 30, 2019

(65) Prior Publication Data

US 2020/0004615 A1 Jan. 2, 2020

Related U.S. Application Data

(60) Provisional application No. 62/691,606, filed on Jun. 28, 2018.

(51) Int. Cl.
  *G06F 9/54* (2006.01)
  *G06F 16/21* (2019.01)
  (Continued)

(52) U.S. Cl.
  CPC ............. *G06F 9/547* (2013.01); *G06F 9/54* (2013.01); *G06F 16/212* (2019.01);
  (Continued)

(58) Field of Classification Search
  None
  See application file for complete search history.

(56) References Cited

U.S. PATENT DOCUMENTS 10,140,325 B2 * 11/2018 Fung ................. G06F 16/24544
10,268,737 B2 * 4/2019 Fung .................... G06F 16/283
(Continued)

FOREIGN PATENT DOCUMENTS

EP    3564829    11/2019

OTHER PUBLICATIONS

He et al.; "Graphs-at-a-time: Query Language and Access Methods for Graph Databases"; Jun. 2008; SIGMOD'08; p. 405-417. (Year: 2008).*

(Continued)

*Primary Examiner* — Umut Onat
(74) *Attorney, Agent, or Firm* — Brownstein Hyatt Farber Schreck, LLP

(57) ABSTRACT

Embodiments are directed to defining, at a client computer, a schema in a graph query language processing system. Defining the schema can include mapping a first resource of a plurality of resources from a cloud infrastructure API to a first field in the schema, mapping a second resource of the plurality of resources from the cloud infrastructure API to a second field in the schema, and generating and submitting a query to the endpoint based on the schema that causes retrieving the first resource from the cloud infrastructure API and the second resource from the cloud infrastructure API. Embodiments include generating a digital data display at the client computer that that shows the first resource and the second resource in a unified format. The method can also be adapted to enhance cloud infrastructure APIs by providing a solution to accessing dependent resources with a single client request.

15 Claims, 4 Drawing Sheets

(51) Int. Cl.
  *G06F 16/901* (2019.01)
  *G06F 16/245* (2019.01)
  *G06F 16/248* (2019.01)

(52) U.S. Cl.
  CPC .......... *G06F 16/213* (2019.01); *G06F 16/245* (2019.01); *G06F 16/248* (2019.01); *G06F 16/9024* (2019.01)

(56) References Cited

U.S. PATENT DOCUMENTS

| | | |
|---|---|---|
| 2008/0243772 A1 | 10/2008 | Fuxman et al. |
| 2009/0125512 A1 | 5/2009 | Robertson et al. |
| 2009/0222467 A1 | 9/2009 | Kalia et al. |
| 2011/0320431 A1 | 12/2011 | Jackson et al. |
| 2014/0067781 A1 | 3/2014 | Wolchok et al. |
| 2015/0378994 A1 | 12/2015 | Kaplinger et al. |
| 2016/0381136 A1 | 12/2016 | Li et al. |
| 2017/0039260 A1 | 2/2017 | Adya et al. |
| 2017/0193058 A1* | 7/2017 | Fung ..................... G06F 16/248 |
| 2017/0346875 A1 | 11/2017 | Wells et al. |
| 2018/0032574 A1 | 2/2018 | Vandenberg et al. |
| 2018/0089290 A1* | 3/2018 | Haggie ................. G06F 16/951 |
| 2018/0210927 A1 | 7/2018 | Karam et al. |
| 2018/0210966 A1* | 7/2018 | Bedi ................. G06F 16/9024 |
| 2019/0196890 A1* | 6/2019 | Bucchi .................... G06F 9/547 |
| 2019/0340273 A1* | 11/2019 | Raman ................. G06F 16/903 |
| 2019/0340287 A1* | 11/2019 | Tamjidi ................... G06F 9/547 |
| 2019/0370370 A1* | 12/2019 | Wittern ..................... G06F 9/54 |
| 2020/0004730 A1* | 1/2020 | Brown .................. G06F 16/211 |
| 2020/0097559 A1 | 3/2020 | Wittem et al. |

OTHER PUBLICATIONS

Hartina et al., "Performance Analysis of GraphQL and RESTful in SIM LP2M of the Hasanuddin University," The $2^{nd}$ East Indonesia Conference on Computer and Information Technology (EIConCIT), pp. 237-240, 2018.

* cited by examiner

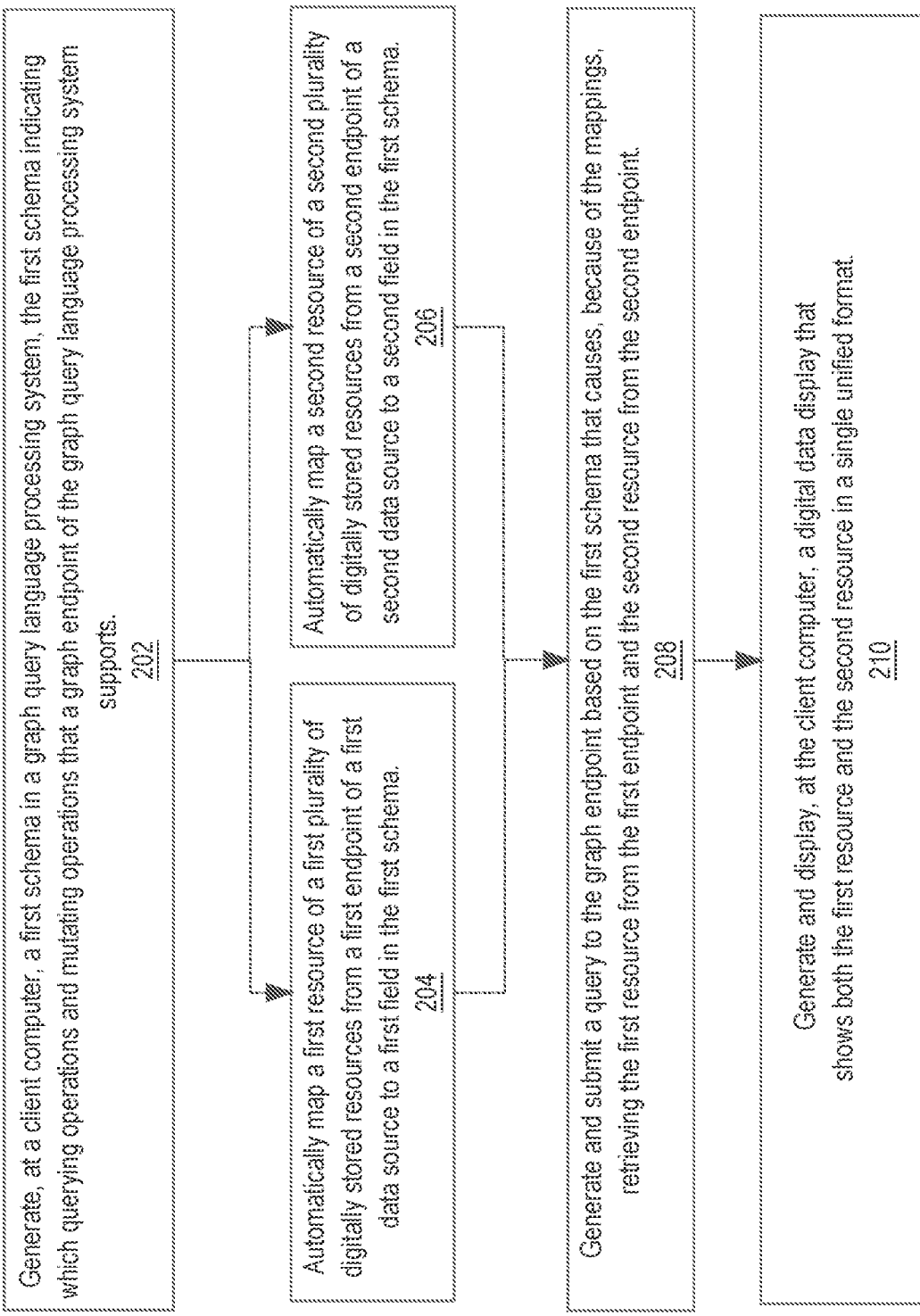

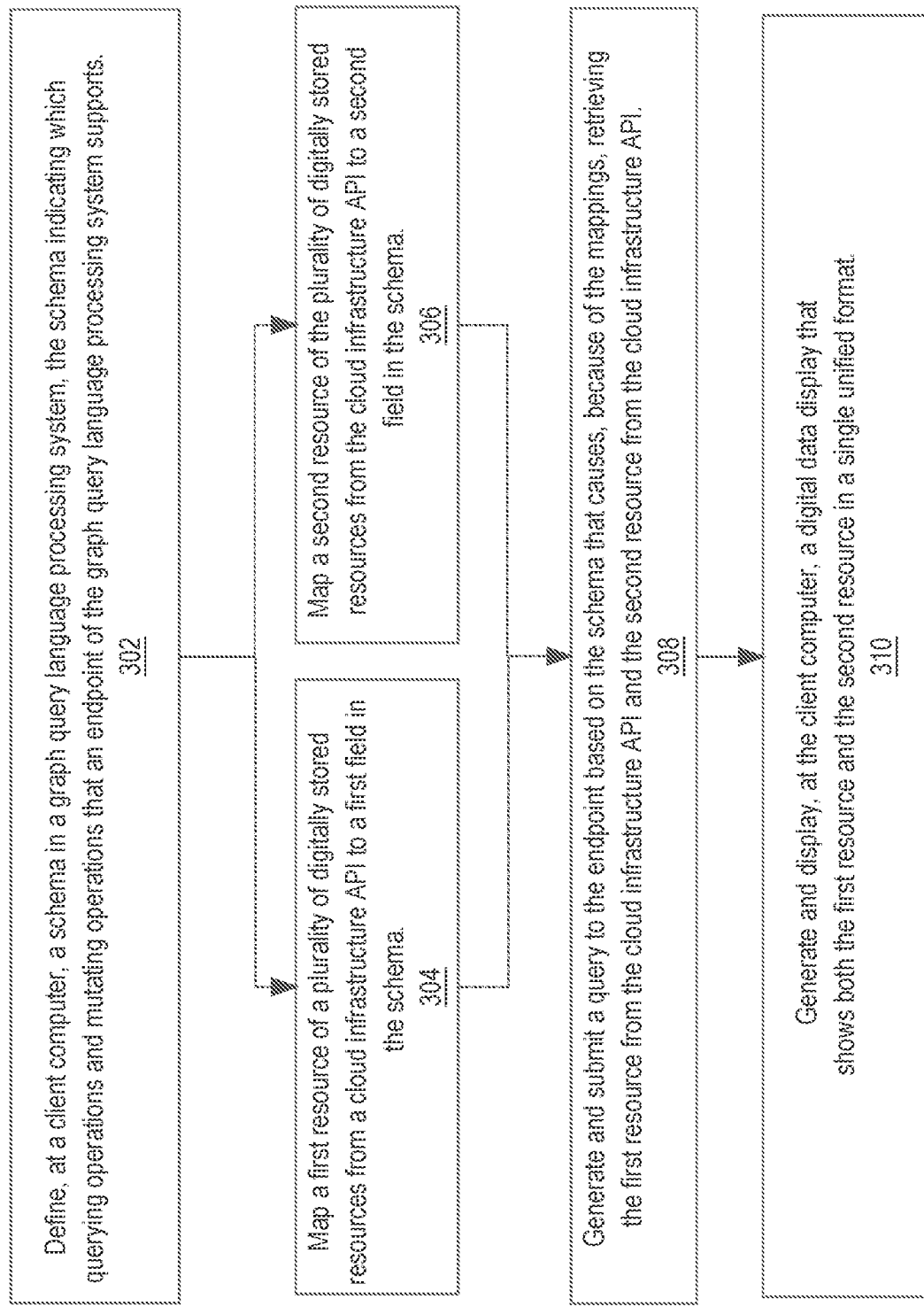

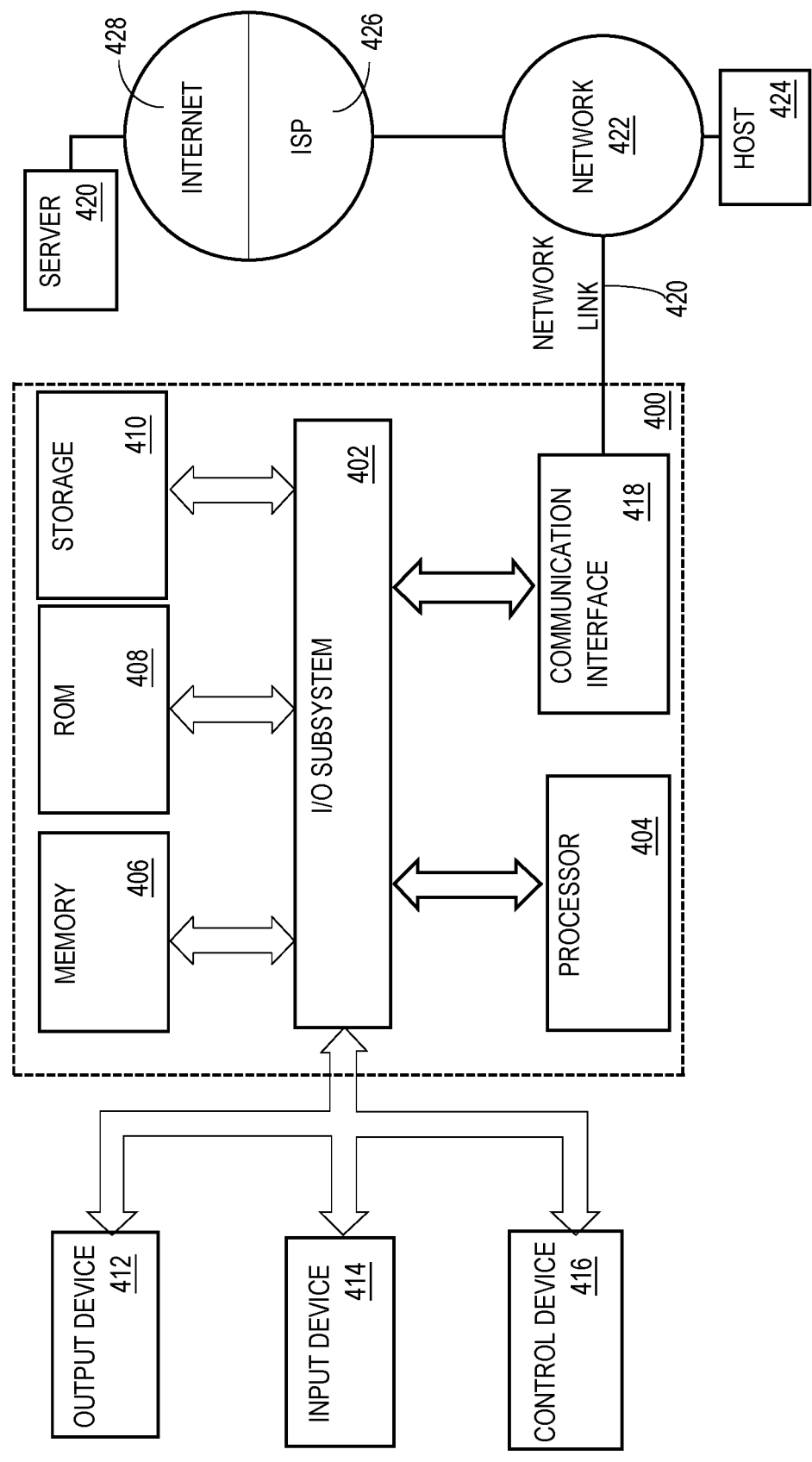

CALL PROCESS FOR GRAPH DATA OPERATIONS

BENEFIT CLAIM

This application claims the benefit under 35 U.S.C. § 119(e) of provisional application 62/691,606, filed Jun. 28, 2018, the entire contents of which are hereby incorporated by reference for all purposes as if fully set forth herein.

TECHNICAL FIELD

One technical field of the present disclosure is query language processing. Another technical field is computer-implemented application programming interface (API) management.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

GRAPHQL is a data query language developed internally by Facebook and publicly released in 2015. It provides an alternative to representational state transfer (REST) and ad-hoc web service architectures. It allows client processes to define the structure of the data required, and exactly the same structure of the data is returned from the server. It is a strongly typed runtime which allows clients to dictate what data is needed, therefore preventing excessively large amounts of data from being returned. Significant GRAPHQL clients include APOLLO CLIENT and Relay. GRAPHQL servers are available for multiple languages, including JAVASCRIPT, PYTHON, RUBY, JAVA, C#, SCALA, GO, ELIXER, ERLANG, PHP, and CLOJURE. GRAPHQL also includes a Schema Definition Language (SDL).

While GRAPHQL has many benefits, its use is largely underdeveloped. Considering the current state of the industry, there is a need for improved systems, methods of using GRAPHQL to enhance external APIs and SDKs, through defining and generating schemas.

BRIEF DESCRIPTION OF THE DRAWINGS

In the drawings:

FIG. 2 illustrates an example flowchart of a method for automatically integrating multiple graph data structures.

FIG. 3 illustrates an example flowchart of a method for enhancing cloud infrastructure APIs.

FIG. 4 shows a block diagram of a computer system with which an embodiment of the invention may be implemented.

DESCRIPTION OF EXAMPLE EMBODIMENTS

Figure 1:
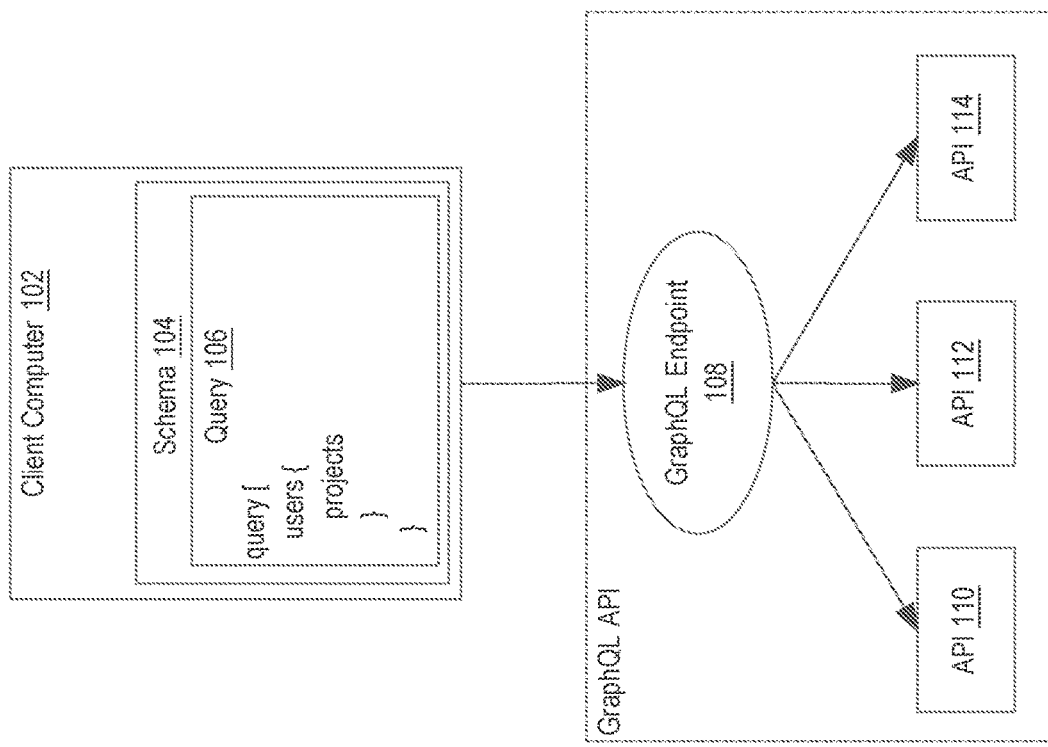
FIG. 1 illustrates a GRAPHQL query architecture.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections according to the following outline:
1. OVERVIEW
2. EXAMPLE GRAPH QUERY LANGUAGE
3. AUTOMATIC SCHEMA GENERATION
4. ENHANCING CLOUD APPLICATION PROGRAMMING INTERFACES
5. HARDWARE OVERVIEW
6. EXTENSIONS AND ALTERNATIVES

1. OVERVIEW

The following describes systems and methods for addressing needs such as described above, among other needs, by automatically generating combined schemas based on two or more schemas or data sources and enhancing cloud infrastructure APIs using graph-processing system based techniques.

In an embodiment, a method comprises: electronically digitally obtaining access to one or more distributed data storage devices that digitally store a first resource and a second resource, each of the first resource and second resource comprising one or more digitally stored data objects, each of the first resource and second resource having different organizational formats that are not natively displayable together; generating, at a client computer, a first schema in a graph query language processing system, the schema indicating which querying operations and mutating operations that a graph endpoint of the graph query language processing system supports, wherein generating the first schema comprises: automatically mapping a first resource of a first plurality of resources from a first endpoint of a first data source to a first field in the first schema; automatically mapping a second resource of a second plurality of resources from a second endpoint of a second data source to a second field in the first schema; generating and submitting a query to the graph endpoint based on the first schema that causes retrieving the first resource from the first endpoint and the second resource from the second endpoint; generating and causing displaying, at the client computer, a digital data display that shows the first resource and the second resource in a unified format.

In various embodiments, the first endpoint hosts a first server program that is responsive to REST calls to an application programming interface (API) implemented by the server program and the second endpoint hosts a second server program that is responsive to REST calls to an API implemented by the second server program.

In various embodiments, a first configuration file is defined comprising a mapping of the first resource of the first plurality of resources of the first data source to a third field of a second schema. A second configuration file is defined comprising a mapping of the second resource of the second plurality of resources of the second data source to a fourth field of a third schema. The first schema is generated based on the first configuration file and second configuration file.

In another embodiment, a method comprises: defining, at a client computer, a schema in a graph query language processing system, the schema indicating which querying operations and mutating operations that an endpoint of the graph query language processing system supports, wherein defining the schema comprises: mapping a first resource of a plurality of resources from a cloud infrastructure API to a first field in the schema; mapping a second resource of the plurality of resources from the cloud infrastructure API to a second field in the schema; generating and submitting a query to the endpoint based on the schema that causes retrieving the first resource from the cloud infrastructure API and the second resource from the cloud infrastructure API; generating and causing displaying, at the client computer, a digital data display that shows the first resource and the second resource in a unified format.

In various embodiments, accessing the second resource from the cloud infrastructure API is dependent on first accessing the first resource from the cloud infrastructure API.

Graph query language techniques discussed herein allows a client to automatically unify interaction between API producers and API consumers in such a way that there is no necessity to find an agreement of data format and data arrangement. Automatically generating schemas from multiple data sources allows the benefits of a graph query language to easily be scaled as new data sources and schemas are added to a service. Additionally, techniques discussed herein allow a client to retrieve dependent resources from a cloud infrastructure API with a single client request which reduces server trips and usage of network bandwidth. These techniques offer, in addition to the improvements discussed above, reduced usage of network bandwidth using less API calls, CPU cycles, storage, and/or memory because of the efficiency and efficacy of the algorithms that are disclosed. Other aspects, features and embodiments will become apparent from the disclosure as a whole.

2. EXAMPLE GRAPH QUERY LANGUAGE

A graph query language processing system is a specification that defines how to fetch data from a backend system. To illustrate clear examples, this disclosure will refer to GRAPHQL for use in some embodiments, but other embodiments may use other graph query language systems that are functionally similar or equivalent to GRAPHQL, and GRAPHQL is not required in every embodiment. GRAPHQL, as an example, is similar to REST and often uses the same HTTP(s) transports as REST. However, rather than using various path-based URIs and HTTP verbs, GRAPHQL uses a single endpoint with a defined schema that specifies how to not only fetch data but also mutate, or change, data.

Building a GRAPHQL service requires a schema to be defined that describes the types, fields, and queries available for the service. A schema is the contract between the server and the client that specifies not only what data is available but also what types of data is available and how individual pieces of data are related.

The core building block within a schema is the type. Types provide a wide-range of functionality within a schema, including the ability to: create relationships between types (e.g. between a Book and an Author) and define which data-fetching (querying) and data-manipulation (mutating) operations can be executed by the client.

Every field within a GRAPHQL schema has either a primitive type, such as int, string, float, boolean, etc., or a complex type. Schemas are composed of classes made up of one or more fields. Clients may select those classes, choosing precisely the relevant fields needed.

```
interface Person {
    firstName: String!
    lastName: String
}
type Actor implements Person {
    firstName: String!
    lastName: String
}
type Movie {
    name: String!
    genre: Genre!
    actors: [Character]
    director: [Director]
}
type Query {
    movies: [Movie]
}
```

For example, the above code snippet shows a GRAPHQL movie-based schema with defined types. Object types describe object types that can be fetched, including what fields it provides. For example, Movie is an object type, with fields name, genre, actors, and director. [Character] indicates an array of Character objects. Query types describe an entry point into a GRAPHQL service. The Query type defines the queries available for the GRAPHQL service.

Each type is composed of one or more fields, which can be scalar values or complex objects that refer to other types. All GRAPHQL queries must at least specify fields to be returned.

GRAPHQL implements a human-readable schema syntax known as its Schema Definition Language ("SDL") to define schemas. The SDL is used to express the types available within a schema and how those types relate to each other. The declarations, as shown in the above code snippet, express the relationships and the shape of the data to return, not where the data comes from or how it might be stored—which is covered outside the SDL. By drawing the logical connections in the schema definition using SDL, a client is able to see what data is available and request it in a single optimized query.

SDL includes a query type. A GRAPHQL query is for fetching data and compares to the GET verb in REST-based APIs. In order to define what queries are possible on a server, the Query type is used within the SDL as shown in the above code snippet. The Query type is one of many root-level types which defines functionality for clients and acts as an entry-point to other more specific types within the schema. An example GRAPHQL query for the above defined schema is shown below:

```
query {
    movies {
        name
        actors {
            firstName
            lastName
        }
    }
}
```

SDL also includes a mutation type. Mutations are operations sent to the server to create, update or delete data. These are comparable to the PUT, POST, PATCH and DELETE verbs on REST-based APIs. Much like how the Query type defines the entry-points for data-fetching operations on a GRAPHQL server, the root-level mutation type specifies the entry points for data-manipulation operations.

Schemas also support arguments within field selections to further define customization to clients. As an example, a particular numerical metric field may choose to provide a unit argument that specifies what data unit to output the value in. This is in contrast to typical systems that output a value in a single standard unit and rely on documentation to express what unit it is—putting the unnecessary onus on each client to manage the conversions. With GRAPHQL, the client can specify the precise unit as an argument to the data selection. GRAPHQL can then manage the conversions and return the appropriate value to the client. Ultimately, this customization allows the logic and control to happen server side, which is often more effective and easier, removing the stress from each client application.

As discussed above, query types describe an entry point into a GRAPHQL service. GRAPHQL enables developers to translate their backend data into the application data graph on the frontend using schemas and SDL. This schema defines the types and queries available and then becomes the specification for an API. Once the schema is defined, resolver functions are used for fetching data from remote endpoints.

When a client issues a query to a GRAPHQL endpoint, each field on each type is resolved by a resolver function at the GRAPHQL endpoint. The resolver function defines how data is fetched for that field and returns data for that field. Resolvers may query databases, other APIs, or data services. This allows resolvers to make use of database clients, network libraries, or any sort of custom data fetching logic.

As discussed above, GRAPHQL uses a single endpoint, referred to herein as an 'endpoint' or 'graph endpoint', with a defined schema that specifies how to not only fetch data but also mutate, or change, data.

FIG. 1 illustrates a GRAPHQL query architecture. Using GRAPHQL, a user on the client computer 102 first defines a schema 104 using SDL. The client computer 102 then may submit a query 106, based on the schema 104, to a GRAPHQL endpoint 108. The GRAPHQL endpoint 108 may exist on a server computer and be accessible over a network. The query 106 is received at the GRAPHQL endpoint 108 and is executed by the server computer. Executing the query 106 may comprise GRAPHQL services executing resolver functions for each field. Executing resolver functions may include querying a database, one or more external APIs 110, 112, 114 and/or services, or other REST endpoints. GRAPHQL services may then format the data as specified by the query 106 and schema 104 and deliver the result to the client computer 102. The result is returned that mirrors the shape of the requested query, typically as JSON or XML.

REST APIs are generally a collection of endpoints, with each endpoint representing a specific resource. When a client wants to access more than one resource at a time, it requires them to make multiple round-trips to the server to retrieve the data they need. For example, in order to access multiple APIs, a client computer is required to make multiple API requests—at least one for each API that the client wants to access. This is in contrast to the GRAPHQL example described above where only a single query submitted to a single GRAPHQL endpoint is needed to access multiple APIs.

Additionally, clients usually have no control over the fields that are returned by a REST endpoint. The REST API returns all fields that are specified for an endpoint, no matter which content the client has requested. The main advantage of GRAPHQL over REST services is the ability to send the requested data over just one endpoint. Not only can multiple resources be combined into one output, clients also have control over the fields that are returned.

For example, for an endpoint defined as '/movie/:movieId' where the 'movieId' specifies the ID of a movie, the following payload is returned for the movie ID associated with the movie 'Fight Club':

```
{
    "budget": 63000000,
    "genres": [ ... ],
    "homepage": "",
    "id": 580,
    "original_language": "en",
    "original_title": "Fight Club",
    "overview": "...",
    "popularity": 0.5,
    "poster_path": null,
    "production_companies": [ ... ],
    "production_countries": [ ... ],
    "status": "Released",
    "tagline": "...",
    "title": "Fight Club",
    "vote_average": 7.9,
    "vote_count": 3489
}
```

In addition to the basic details about a movie as shown above, to retrieve details about the movie cast, a request to the endpoint '/movies/:movieId/credits' must be made. Thus, a client would have to make a request to at least two endpoints to retrieve desired movie data—one request to a first endpoint to retrieve the basic details of the movie and a second request to a second endpoint to retrieve the movie credits. Additionally, using REST, the entire payload from each endpoint is received when a request is made to each respective endpoint. In order to display only the desired data to a user or operate on specific fields, the fields from the endpoint payloads must be filtered.

Using GRAPHQL techniques described herein, the over-fetching of information is simplified by defining a query containing all the fields or the information that are desired from the endpoint. For example, to retrieve the title, vote_average, vote_count, and cast (name, character) for the movie 'Fight Club' this would translate to the following in GRAPHQL:

```
// GraphQL query for 'Fight Club', movieId = 580
movie(movieId: 580) {
    title,
    vote_average,
    vote_count,
    credits {
        cast {
            name,
            character
        }
    },
}
```

GRAPHQL techniques described herein provide more flexible access to the underlying data through composition, selection, and mutation. Using techniques described herein, a client may define what data exactly is needed at query time, all the data required to render an application view can be requested in a single request, reducing the number of roundtrip network requests and with that, the application latency.

As shown above, rather than having to fetch multiple documents via REST, only to use a handful of data from each of those requests, a client may specify precisely which fields to select from an API payload. Using techniques described herein, a client is able to make a single call to fetch the required information rather than to construct several REST requests to fetch the same data. This allows for clients to reduce network cost and latency by avoiding multiple trips.

As discussed herein, an 'endpoint' is a URI or URL that is used to make a request. A 'resource' is focused on the data set that is returned by a request. A data set can be accessed from an endpoint. A data set returned by a request may comprise one or more resources. A resource may comprise one or more objects. For example, in XML, a resource may correspond to an element or sub-element of the element such as <student></student>. In JSON, a resource may correspond to a name/value pair. Different resources may be electronically digitally stored in different distributed data storage devices to which access is obtained as part of executing the processes described herein. In some embodiments, the data storage devices digitally store a first resource and a second resource, each of the first resource and second resource comprising one or more digitally stored data objects, each of the first resource and second resource having different organizational formats that are not natively displayable together, but the techniques herein provide effective technical solutions to the problem of how to display the first resource and the second resource (or many such diverse resources) in a single unified display.

3. AUTOMATIC SCHEMA GENERATION

GRAPHQL schemas and/or data sources may be integrated or 'braided' together automatically using techniques described herein. Schemas and/or data sources can be combined into a single braided schema and then the single braided schema can be used to build a GRAPHQL instance per-request.

FIG. 2 shows an example flow 200 of a method for automatically integrating multiple graph data structures.

Although the steps in FIG. 2 are shown in an order, the steps of FIG. 2 may be performed in any order and are not limited to the order shown in FIG. 2. Additionally, some steps may be optional, may be performed multiple times, or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

At step 202, a first schema is generated at a client computer in a graph query language processing system, the first schema indicating which querying operations and mutating operations that a graph endpoint of the graph query language processing system supports. The first schema may also be referred to as a 'braided schema' and may be generated based on multiple schemas and/or data sources as discussed in steps 204 and 206.

In an embodiment, top level fields of all specified data sources are aggregated into a braided schema. In another embodiment, fields from each data source can be configured so that a client can select which fields are added into a braided schema. A REST or GRAPHQL schema source can be configured via a YAML file. For example, the YAML snippet below configures a REST source out of a Bitbucket followers endpoint:

```
name: bb-followers
rootFields:
    followers:
        uri: https://api.bitbucket.org/2.0/users/{username}/followers
        responseMapping:
            - key: nodes
              op: copyList
              mapper:
                  - key: display name
                    op: copy
                    target: name
schema: |
    schema {
        query: Query
    }
    type Query {
        followers(username: String) : FollowersSet
    }
    type FollowersSet {
        nodes: [Follower]
    }
    type Follower {
        name: String
    }
```

The configuration file shown above contains two primary sections: the schema and root field mappings. The schema specifies the GRAPHQL schema this source will expose. The "rootFields" section contains a list of root fields and instructions for mapping the response of the URI to the desired GRAPHQL structure.

At step 204, as part of generating the schema of step 202, a first resource of a first plurality of digitally stored resources from a first endpoint of a first data source is automatically mapped to a first field in the first schema. The first data source may be configured using a first configuration file such as the one discussed with respect to step 202. The first configuration file may specify a second schema with fields that are mapped to selected resources, such as the first resource, from the first data source. When a braided schema is generated, the fields specified in the second schema from the first configuration file and corresponding mappings to resources are aggregated and included in the braided schema. Resources from the first data source that are not mapped to a field in the second schema from the configuration file are left out of the generated braided schema.

In an embodiment, the first endpoint hosts a first server program that is responsive to representational state transfer (REST) calls to an application programming interface (API) implemented by the server program.

At step 206, as part of defining the schema of step 202, a second resource of a second plurality of digitally stored resources from a second endpoint of a second data source is automatically mapped to a second field in the schema. Similar to the first data source from step 204, the second data source may be configured using a second configuration file such as the one discussed with respect to step 202. The second configuration file may specify a third schema with fields that are mapped to selected resources, such as the second resource, from the second data source. When a braided schema is generated, the fields specified in the third schema from the second configuration file and corresponding mappings to resources are aggregated and included in the braided schema. Resources from the second data source that are not mapped to a field in the second schema from the configuration file are left out of the generated braided schema.

In an embodiment, the second endpoint hosts a second server program that is responsive to REST calls to an API implemented by the second server program.

At step 208, a query is generated and submitted to the graph endpoint based on the schema that causes, because of the mappings of steps 204 and 206, retrieving the first resource from the first endpoint and the second resource from the second endpoint. When a client issues a query to a graph endpoint, each field on each type is resolved by a resolver function at the graph endpoint. The resolver function defines how data is fetched for that field and returns data for that field.

At step 210, a digital data display is generated and displayed at a client computer that shows both the first resource and the second resource in a single unified format. The first schema defines the format of presenting the first resource and second resource on the client computer. The format is 'unified' in a sense that both the first resource and second resource are displayed together in the same output as a result of a single request made by the client.

In an embodiment, schemas may be generated or combined through links. A link connects a field associated with a first data source or schema to be resolved against a second data source. A link uses a unique identifier to map one or more fields associated with a first data source or schema to a second data source, e.g., a link may be defined that uses a unique identifier to map a field associated with a first data source or schema to a resource from a second data source. A link allows the first data source or schema to simply know about the unique identifier of an object, and the second data source to know about its details, while the client sees an integrated schema.

For example, for two data sources: 'foo' and 'bar'. 'foo' has a type 'foo' that contains a 'bar' field that is a string identifier. The 'bar' data source contains all the information about the 'Bar' type. With a single schema, a client is able to query both foo and bar data in a single request.

```
query {
  foo {
    title
    bar {
      name
    }
  }
}
```

By linking fields, the query shown above executes the following two queries, one to 'foo' and one to 'bar'.

```
query {
  foo {
    title
    bar
  }
}
```

```
query {
  bar(id:$barId) {
    name
  }
}
```

In another embodiment, schemas can be combined into a single braided schema through type merging. Type merging allows two types that provide unique fields to be combined into one final type that contains all fields.

For example, if the "foo" data source provides a "Foo" type that contains a "key" field, and a client wants to merge that with a "bar" data source that has another type with two other fields, the following YAML configuration can be used to merge types:

```
extensions:
  - type: Foo
    field: key
    by:
      namespace: bar
      type: FooObject
      query: foo
      arg: key
```

Using the above configuration, the new 'Foo' type can be queried as follows:

```
{
  foo {
    key
    name
    bar {
      title
    }
  }
}
```

To resolve the query, the braided schema queries the first data source and retrieves the 'key' field:

```
{
  foo100: foo(id: $id100) {
    key
  }
}
```

Then, with the value of "key", the braided schema will query the second source to retrieve the other fields:

```
{
  foo100: foo(key: $key100) {
    bar {
      title
    }
    name
  }
}
```

4. ENHANCING CLOUD APPLICATION PROGRAMMING INTERFACES

In an embodiment, GRAPHQL techniques can be used to enhance cloud infrastructure APIs.

In complex APIs such as cloud infrastructure APIs, the access of a resource is often dependent on first accessing another resource, i.e. it is not possible to retrieve a specific resource without first accessing another resource. A resource is dependent if it requires more than one call to an API to access the resource. For example, Amazon Web Services (AWS) S3 is a cloud storage service that provides object storage through a cloud-based web service interface. The API for S3 provides functions for listing storage resources such as buckets and objects. The API for S3 also provides functions retrieving access control lists (ACLs) for each respective resource. The offered API, however, does not provide functionality to list a bucket and retrieve the respective bucket's ACL simultaneously in a single API call. To retrieve the ACL for a bucket, a first API call must be made to retrieve the name of the bucket and then using the name of the bucket, a second API call can be made to retrieve the ACL for the named bucket. This is a typical situation that arises in complex APIs where users/developers interact with many related entities that require different permissions for accessing different pieces of data.

For example, using the direct AWS S3 API, the provided AWS S3 API function 'list buckets' is defined as follows:
public List<Bucket>listBuckets(ListBucketsRequest listBucketsRequest) throws SdkClientException, AmazonServiceException The above API call returns a list of objects of type 'Bucket' containing the following three fields: 'creationDate', 'name', and 'owner'. A 'Bucket' object does not contain any information about a corresponding ACL. To get an ACL for a 'bucket', a call to 'get bucket ACL' function has to be made:
public AccessControlList getBucketAcl(GetBucketAclRequest getBucketAclRequest) throws SdkClientException, AmazonServiceException Therefore, to get a list of buckets together with ACLs, the following algorithm requiring multiple API calls (written in pseudocode) has to be compiled/interpreted and executed on a machine that has access to the AWS account of interest:

```
for each bucket in amazonS3Client.listBuckets( ) response {
    bucketAcl = amazonS3Client.getBucketAcl(bucket.getName( ))
    addResult(bucket, bucketAcl)
}
```

Techniques described herein can be used to enhance a cloud infrastructure API so that multiple API payloads may be retrieved with a single client request.

FIG. 3 shows an example flow 300 of a method for enhancing cloud infrastructure APIs.

Although the steps in FIG. 3 are shown in an order, the steps of FIG. 3 may be performed in any order and are not limited to the order shown in FIG. 3. Additionally, some steps may be optional, may be performed multiple times, or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

At step 302, a schema is defined at a client computer in a graph query language processing system, the schema indicating which querying operations and mutating operations that an endpoint of the graph query language processing system supports. The steps of defining the details of the schema are discussed with respect to steps 304 and 306.

In an embodiment, cloud infrastructure APIs may include the Amazon Web Services (AWS) family, including, but not limited to S3, EC2, RDS, ECS, SQS, SNS, Kinesis, Dynamo, ElastiCache, CloudWatch, Code(Commit/Build/Deploy) and CodePipeline.

At step 304, as part of defining the schema of step 302, a first resource of a plurality of digitally stored resources from a cloud infrastructure API is mapped to a first field in the schema.

At step 306, as part of defining the schema of step 302, a second resource of the plurality of digitally stored resources from the cloud infrastructure API is mapped to a second field in the schema.

At step 308, a query is generated and submitted to the endpoint based on the schema that causes, because of the mappings of steps 304 and 306, retrieving the first resource from the cloud infrastructure API and the second resource from the cloud infrastructure API. When a client issues a query to an endpoint, each field on each type is resolved by a resolver function at the endpoint. The resolver function defines how data is fetched for that field and returns data for that field.

At step 310, a digital data display is generated and displayed at a client computer that shows both the first resource and the second resource together in a unified format. The schema defines the format of presenting the first resource and second resource on the client computer. The format is 'unified' in a sense that both the first resource and second resource are displayed together in the same output as a result of a single request made by the client.

As an example of flow 300, a schema may be defined as follows:

```
# Represents an Amazon S3 Access Control List (ACL), including the ACL's set of grantees
and the permissions assigned to each grantee.
type AwsS3AccessControlList {
    # Indicates if the requester is charged for conducting this operation from requester Pays
Buckets
    requesterCharged: Boolean!
    # The owner of this access control list
    owner: AwsS3Owner!
    # The list of Grant objects in this access control list
    grants: [AwsS3Grant!]!
}
# Represents an Amazon S3 bucket.
type AwsS3Bucket {
    # The name of this bucket
    name: String!
    # The owner of this bucket
    owner: AwsS3Owner
```

```
    # The date this bucket was created
    creation: Date!
    # The location of this bucket
    location: String!
    # The access control list of this bucket
    acl: AwsS3AccessControlList!
}
# Specifies a grant, consisting of one grantee and one permission.
type AwsS3Grant {
    # The grantee being granted a permission by this grant
    grantee: AwsS3Grantee!
    # The permission being granted to the grantee by this grant
    permission: AwsS3Permission!
}
# Represents a grantee (entity) that can be assigned access permissions in an access control list.
type AwsS3Grantee {
    # The identifier for the type of this grant, to be used when specifying grants in the header of a request.
    typeIdentifier: String!
    # The identifier for this grantee. The meaning of the grantee identifier is specific to implementation.
    identifier: String!
}
# Represents the owner of an Amazon S3 bucket.
type AwsS3Owner {
    # The ID of the owner
    id: String!
    # The display name of the owner
    displayName: String!
}
# Specifies constants defining an access permission, as granted to grantees in an access control list.
enum AwsS3Permission {
    # Provides READ, WRITE, READ_ACP, and WRITE_ACP permissions.
    FULL_CONTROL
    # Grants permission to list the bucket when applied to a bucket.
    # Grants permission to read object data and/or metadata when applied to an object.
    READ
    # Grants permission to create, overwrite, and delete any objects in the bucket.
    WRITE
    # Grants permission to read the ACL for the applicable bucket or object.
    READ_ACP
    # Gives permission to overwrite the ACP for the applicable bucket or object.
    WRITE_ACP
}
# Represents a specific instant in time, with millisecond precision.
scalar Date
# Retrieves data
type Query {
    # Lists available Amazon S3 buckets.
    s3_buckets: [AwsS3Bucket!]!
}
```

The above schema defines various types such as 'AwsS3AccessControlList' and 'AwsS3Bucket'. Each object type specifies field mappings such as discussed in steps 304 and 306. For example, the 'AwsS3Bucket' includes a field 'acl' mapped to an 'AwsS3AccessControlList' type. The 'AwsS3AccessControlList' object type includes a field 'owner' that is mapped to an 'AwsS3Owner' type. Each field on each type is resolved by a corresponding resolver function when a query is submitted to an endpoint. The resolver functions define how data is fetched for that field from the cloud infrastructure API and returns data for that field.

An example query based on the above schema is shown as follows:

```
query BucketsWithACLs {
    s3_buckets {
        name
        owner {
            displayName
        }
        acl {
            grants {
                grantee {
                    typeIdentifier
                    identifier
                }
                permission
            }
        }
    }
}
```

As discussed in step 308, a query is generated and submitted to the endpoint based on the schema that causes retrieving a first resource and a second resource from a cloud infrastructure API. As discussed previously, the mappings for each field are defined in the schema. When the query is submitted to the endpoint, the resolver functions for each field may asynchronously query the cloud infrastructure API to retrieve the required data.

The result of the query shows the result of the buckets API and corresponding ACL in a unified format, as discussed in step 310, as follows:

```
{
  "data": {
    "s3_buckets": [
      {
        "name": "codepipeline-us-west-1-713805018287",
        "owner": {
          "displayName": "john.smith"
        },
        "acl": {
          "grants": [
            {
              "grantee": {
                "typeIdentifier": "id",
                "identifier": "a5b6e8d0cc372326130b0ebd4e76d836dd639daac32f87b8d1464af0eac5da9a"
              },
              "permission": "FULL_CONTROL"
            }
          ]
        }
      },
      {
        "name": "artifacts-713805018287",
        "owner": {
          "displayName": "john.smith"
        },
        "acl": {
          "grants": [
            {
              "grantee": {
                "typeIdentifier": "id",
                "identifier": "a5b6e8d0cc372326130b0ebd4e76d836dd639daac32f87b8d1464af0eac5da9a"
              },
              "permission": "FULL_CONTROL"
            }
          ]
        }
      }
    ]
  }
}
```

Unlike direct cloud infrastructure SDK or API users, using the above techniques, a client does not have to know how AWS API works and what SDK functions need to be called to obtain specific types of information about cloud infrastructure associated with particular AWS account(s). Everything that can be known about an AWS account becomes encoded in a schema, while the algorithms needed to retrieve account data through the SDK client libraries or API become hidden and handled using resolver functions of the GRAPHQL service. Using the above techniques, a client is able to retrieve dependent resources from a cloud infrastructure API with a single client request.

5. IMPLEMENTATION MECHANISMS—HARDWARE OVERVIEW

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 4 is a block diagram that illustrates an example computer system with which an embodiment may be implemented.

In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 204. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 208 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406.

Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of 110 subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, Internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
electronically digitally obtaining access to one or more distributed data storage devices that digitally store a first resource and a second resource each of the first resource and the second resource being selected from a plurality of digitally stored resources, the first resource comprising a first set of one or more digitally stored data objects and the second resource comprising a second set of one or more digitally stored data objects, each of the first resource and the second resource having different organizational formats that are not natively displayable together;
defining, at a client computer, a braided schema in a graph query language processing system, the braided schema indicating which querying operations and mutating operations that an endpoint of the graph query language processing system supports, wherein defining the braided schema comprises:
mapping the first resource of the plurality of digitally stored resources from a cloud infrastructure API to a first field in the schema;
mapping the second resource of the plurality of digitally stored resources from the cloud infrastructure API to a second field in the schema by generating a link between the first resource to the second resource that causes the first field in the schema to be resolved against the second resource;
generating and submitting a query to the endpoint based on the braided schema that causes, due to the mappings:
submitting a first resource request to the cloud infrastructure API;
receiving a first response to the first resource request, the first response comprising a first data object;
generating a second resource request comprising a value based on the first data object;
submitting the second resource request to the second endpoint of the cloud infrastructure API; and
receiving a second response to the second resource request, the second response comprising a second data object;
in response to submitting the query, receiving an integrated output that comprises the first data object and the second data object; and
displaying, at the client computer, a digital data display that shows the integrated output of the first resource and the second resource in a single unified format.

2. The method of claim 1, wherein the schema is defined by a schema definition language (SDL).

3. The method of claim 1, wherein retrieving the first resource from the cloud infrastructure API and the second resource from the cloud infrastructure API comprises:
executing a first resolver function to resolve the first field in the schema with the first resource; and
executing a second resolver function to resolve the second field in the schema with the second resource.

4. The method of claim 1, wherein the cloud infrastructure API comprises an Amazon Web Services API.

5. The method of claim 1, wherein the first schema defines the single unified format of presenting the first resource and second resource.

6. One or more non-transitory computer-readable media storing instructions which, when executed by one or more processors, cause:
electronically digitally obtaining access to one or more distributed data storage devices that digitally store a first resource and a second resource each of the first resource and the second resource being selected from a plurality of digitally stored resources, the first resource comprising a first set of one or more digitally stored data objects and the second resource comprising a second set of one or more digitally stored data objects, each of the first resource and the second resource having different organizational formats that are not natively displayable together;
defining, at a client computer, a braided schema in a graph query language processing system, the braided schema indicating which querying operations and mutating operations that an endpoint of the graph query language processing system supports, wherein defining the braided schema comprises:
mapping the first resource of the plurality of digitally stored resources from a cloud infrastructure API to a first field in the schema;
mapping second resource of the plurality of digitally stored resources from the cloud infrastructure API to a second field in the schema by generating a link between the first resource to the second resource that causes the first field in the schema to be resolved against the second resource;
generating and submitting a query to the endpoint based on the braided schema that causes, due to the mappings:
submitting a first resource request to the cloud infrastructure API;
receiving a first response to the first resource request, the first response comprising a first data object;
generating a second resource request comprising a value based on the first data object;
submitting the second resource request to the second endpoint of the cloud infrastructure API; and
receiving a second response to the second resource request, the second response comprising a second data object;

in response to submitting the query, receiving an integrated output that comprises the first data object and the second data object; and displaying, at the client computer, a digital data display that shows the integrated output of the first resource and the second resource in a single unified format.

7. The one or more non-transitory computer-readable media of claim 6, wherein the schema is defined by a schema definition language (SDL).

8. The one or more non-transitory computer-readable media of claim 6, wherein retrieving the first resource from the cloud infrastructure API and the second resource from the cloud infrastructure API comprises:

executing a first resolver function to resolve the first field in the schema with the first resource; and executing a second resolver function to resolve the second field in the schema with the second resource.

9. The one or more non-transitory computer-readable media of claim 6, wherein the cloud infrastructure API comprises an Amazon Web Services API.

10. The one or more non-transitory computer-readable media of claim 6, wherein the schema defines the single unified format of presenting the first resource and second resource.

11. A computer system comprising:

one or more processors;

one or more memories storing instructions which, when executed by the one or more processors, cause the one or more processors to:

electronically digitally obtain access to one or more distributed data storage devices that digitally store a first resource and a second resource each of the first resource and the second resource being selected from a plurality of digitally stored resources, the first resource comprising a first set of one or more digitally stored data objects and the second resource comprising a second set of one or more digitally stored data objects, each of the first resource and the second resource having different organizational formats that are not natively displayable together;

define, at a client computer, a braided schema in a graph query language processing system, the braided schema indicating which querying operations and mutating operations that an endpoint of the graph query language processing system supports, wherein defining the braided schema comprises:

mapping the first resource of the plurality of digitally stored resources from a cloud infrastructure API to a first field in the schema;

mapping the second resource of the plurality of digitally stored resources from the cloud infrastructure API to a second field in the schema by generating a link between the first resource to the second resource that causes the first field in the schema to be resolved against the second resource;

generate and submit a query to the endpoint based on the schema that causes, due to the mappings:

submitting a first resource request to the cloud infrastructure API;

receiving a first response to the first resource request, the first response comprising a first data object;

generating a second resource request comprising a value based on the first data object;

submitting the second resource request to the second endpoint of the cloud infrastructure API; and receiving a second response to the second resource request, the second response comprising a second data object;

in response to submitting the query, receiving an integrated output that comprises the first resource and the second resource; and displaying, at the client computer, a digital data display that shows the integrated output of the first resource and the second resource in a single unified format.

12. The system of claim 11, wherein the schema is defined by a schema definition language (SDL).

13. The system of claim 11, wherein retrieving the first resource from the cloud infrastructure API and the second resource from the cloud infrastructure API comprises:

executing a first resolver function to resolve the first field in the schema with the first resource; and executing a second resolver function to resolve the second field in the schema with the second resource.

14. The system of claim 11, wherein the cloud infrastructure API comprises an Amazon Web Services API.

15. The system of claim 11, wherein the schema defines the single unified format of presenting the first resource and second resource.

* * * * *